J. W. MEAKER.

Assignor, by mesne assignments, to himself, H. B. MERRELL & T. FERGUSON.

Apparatus for Holding and Delivering Coin.

No. 8,275. Reissued June 4, 1878.

Witnesses

Harry King

N. M. Stansbury

Inventor

J. W. Meaker by Stansbury & Munn his Attys.

UNITED STATES PATENT OFFICE.

JOHN W. MEAKER, OF CHICAGO, ILLINOIS, ASSIGNOR, BY MESNE ASSIGNMENTS, TO HIMSELF, HENRY B. MERRELL, AND THOMAS FERGUSON.

IMPROVEMENT IN APPARATUS FOR HOLDING AND DELIVERING COIN.

Specification forming part of Letters Patent No. 73,911, dated January 28, 1868; Reissue No. 8,275, dated June 4, 1878; application filed May 14, 1878.

DIVISION B.

*To all whom it may concern:*

Be it known that I, JOHN W. MEAKER, of the city of Chicago, in the county of Cook and State of Illinois, have invented certain new and useful Improvements in Apparatus for Holding and Counting Coin; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention consists of a series of semicircular troughs for holding and registering coin, and of certain mechanical contrivances for assorting and delivering the same in connection therewith, the whole being intended for use in banks, offices, or other places wherever coin is received, kept, or paid out.

Figure 1:
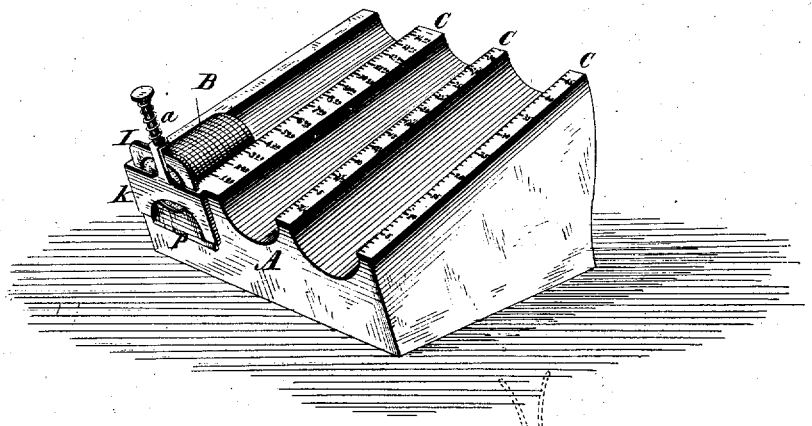
Figure 2:
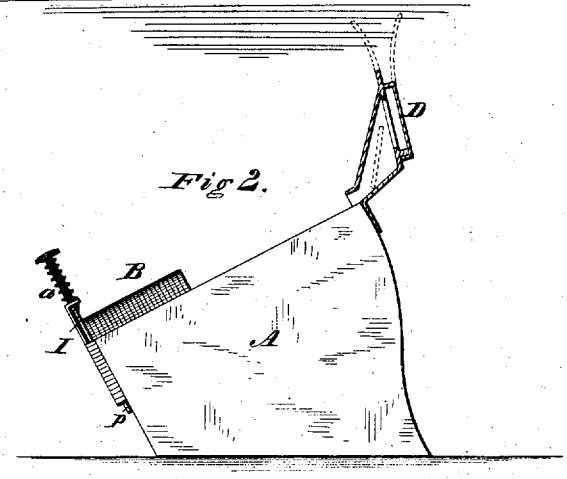

Figure 1 is a perspective view without the assorter; Fig. 2, a vertical longitudinal section with the assorter attached, and Fig. 3 a cross vertical section.

Figure 3:
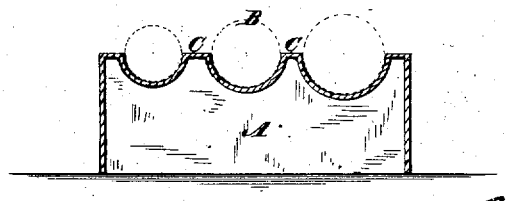

In the drawings, a series of semicircular troughs, A, as represented in Figs. 1 and 3, are arranged side by side to receive and hold the coin B, as shown in said figures, these troughs being inclined, as represented in Fig. 1, sufficiently to cause the coin to slide down therein.

Along the side of each trough an index, C, is arranged, graduated to suit the kind or size of coin for which the same is intended.

At the lower end of each trough is placed a gate, I, having a hole through it of a size corresponding with the size of the coin, as shown in section in Fig. 1, this gate being arranged to slide vertically, and held up by a spring, *a*, so that when released from pressure it will rise to a position to bring the hole in it opposite the mouth of the trough, as shown in the same figure.

In front of the gate is secured a plate or strip, *k*, having its lower edge project slightly over the upper edge of the hole in the slide or gate I, so that a coin which enters the hole will be prevented from falling through until the gate is depressed far enough to let the upper edge of the coin pass out under the plate *k*.

To prevent the lower edge of the coin from accidentally slipping out, a small projection or lip is formed on the lower portion of the gate, so as to project up slightly in front of the hole, as represented by *p*, Fig. 1.

The gate will, of course, be made of a thickness corresponding with that of the coin, so that when a coin slides into the hole in the gate it will just fill it and permit the gate to be depressed without catching on the next coin in the rear. As soon as the gate returns to its position opposite the mouth of the trough, another coin will slip into the hole, and thus the operation may be repeated until the supply of coin is exhausted.

As these troughs may be of different sizes, as shown in Fig. 1, but more clearly in Fig. 3, the size of the device for delivering the same should be made to correspond.

The assorter D, I attach to the upper ends of these troughs, as shown in Fig. 2. It is constructed, arranged, and operates for the distribution of the coin in the troughs when desired, in the same manner as described in the other division of this reissued patent, in which the same is fully explained and claimed.

Having thus described my invention, what I claim is—

1. A series of semicircular troughs of varying diameters for holding different-sized coin, and provided along their sides with indexes graduated to correspond with the varying thickness of the coin, to indicate or register the amount in each trough, as shown and described.

2. In combination with the semicircular inclined trough for holding and registering coin, as described, the gate I, plate *k*, and spring *a*, constructed and arranged as shown, for the purpose set forth.

In testimony that I claim the foregoing I have hereunto set my hand this 24th day of April, 1878.

JOHN W. MEAKER.

Witnesses:
O. A. SMITH,
CHAS. C. BLAYNEY.